United States Patent [19]

Kahn et al.

[11] Patent Number: 4,799,770
[45] Date of Patent: Jan. 24, 1989

[54] LIQUID CRYSTAL CELL FOR IMAGE PROJECTIONS AND METHOD OF OPERATING SAME

[75] Inventors: Frederick J. Kahn, Palo Alto; Elizabeth A. Nevis, Menlo Park; Jerry Leff, Saratoga, all of Calif.

[73] Assignee: Greyhawk Systems, Inc., Milpitas, Calif.

[21] Appl. No.: 169,097

[22] Filed: Mar. 8, 1988

Related U.S. Application Data

[63] Continuation of Ser. No. 914,640, Oct. 2, 1986.

[51] Int. Cl.⁴ .......................... G02F 1/13; G11C 7/00; G11C 13/04
[52] U.S. Cl. .................. 350/331 R; 350/334; 350/338; 350/342; 350/351; 365/108; 365/222
[58] Field of Search .................. 350/331 R, 334, 338, 350/342, 351; 365/222, 108

[56] References Cited

U.S. PATENT DOCUMENTS

| | | | |
|---|---|---|---|
| 3,796,999 | 3/1974 | Kahn | 350/351 |
| 3,972,040 | 7/1976 | Hilsum et al. | 355/222 |
| 4,139,273 | 2/1979 | Crossland et al. | 350/340 |
| 4,499,458 | 2/1985 | Le Berre et al. | 350/351 |
| 4,528,562 | 7/1985 | Crossland et al. | 350/350 S |
| 4,595,260 | 6/1986 | Kubota | 350/351 |
| 4,649,517 | 3/1987 | Kitazema et al. | 350/351 |

*Primary Examiner*—Stanley D. Miller
*Assistant Examiner*—Trong Quang Phan
*Attorney, Agent, or Firm*—Flehr, Hohbach, Test, Albritton & Herbert

[57] ABSTRACT

A liquid crystal cell for an image projection apparatus has a liquid crystal layer sandwiched between two conductive layers. The layer surface is divided into one or more regions and one of the sandwiching conductive layers is divided into separate sections each matching a different region. Busbars are bonded on the other of these conductive layers along the edges and boundary lines between adjacent regions (resistors) such that negative and positive writing/erasing can be performed in selected region or regions. By applying one or more current pulses in one or more of these resistors, the corresponding region or regions can be more completely erased and a uniform dark background can be created therein.

22 Claims, 1 Drawing Sheet

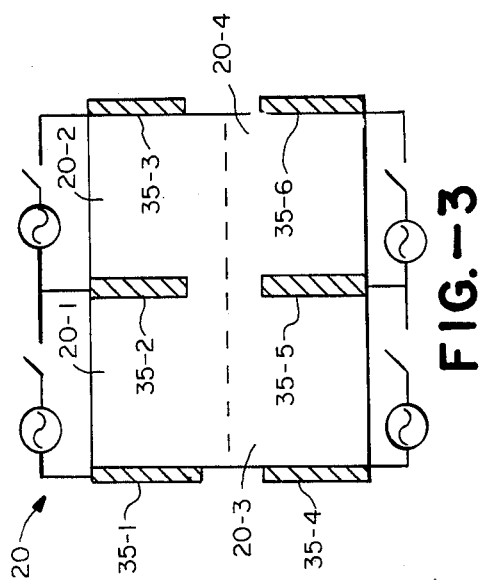
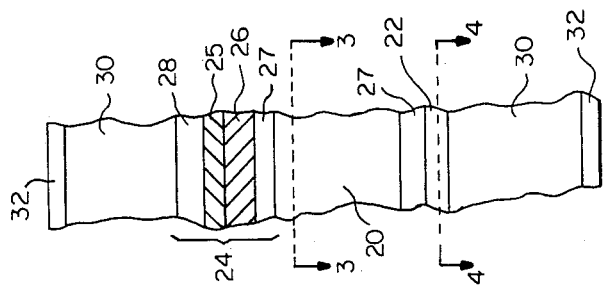
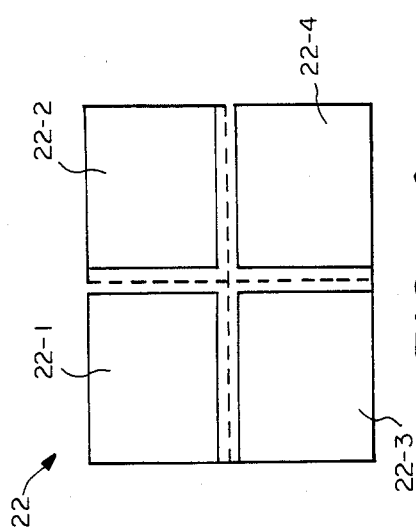
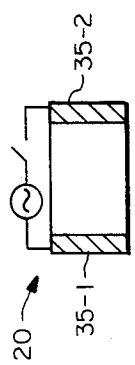
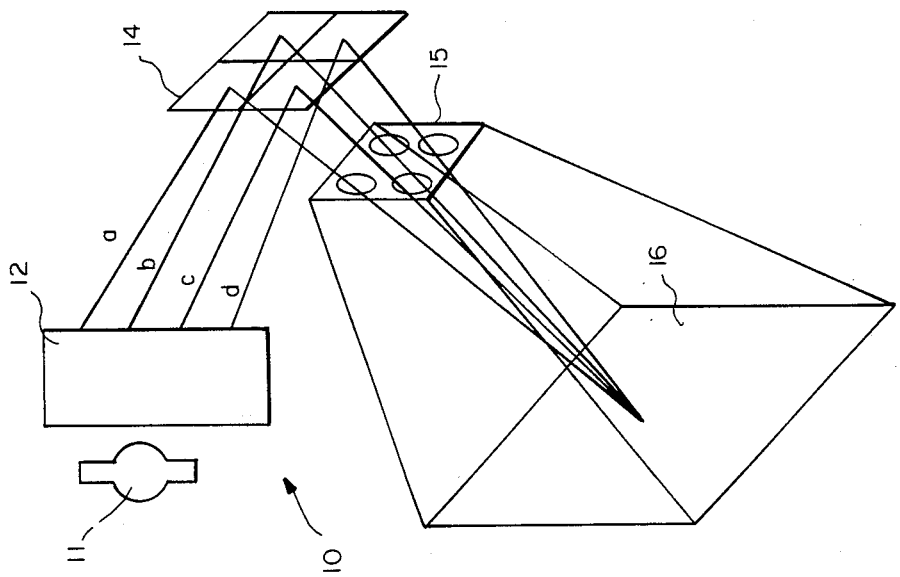

LIQUID CRYSTAL CELL FOR IMAGE PROJECTIONS AND METHOD OF OPERATING SAME

This is a continuation of application Ser. No. 914,640 filed Oct. 2, 1986.

BACKGROUND OF THE INVENTION

This invention relates to a method of and apparatus for forming and projecting high precision optical images by using a laser-addressed liquid crystal cell and more particularly to a method of quickly creating an uniform dark background by such an apparatus for a full-color display.

As disclosed in U.S. Pat. No. 3,796,999 issued Mar. 12, 1974 to F. J. Kahn and reviewed more recently by Dewey ("Laser-Addressed Liquid Crystal Displays" published in Optical Engineering/May/June 1984, Vol. 23, No. 3) and Todd ("Projection Display Devices" Society for Information Display, Seminar Lecture Notes, Vol. II, Paper 8.1, May 3, 1985), for example, it has been known to make use of a laser-addressed P-type smectic liquid crystal to project an image either for display or for creating a hard copy. For such applications, the liquid crystal is usually sandwiched between parallel transparent substrates to form what may generally be referred to as a cell, or a liquid crystal cell. The liquid crystal cell can be reflective or transmissive. A transmissive cell may be formed, for example, by using two transparent electrodes to sandwich a liquid crystal layer. A reflective liquid crystal cell may illustratively have a transparent electrode on one side of the liquid crystal layer and a light-reflective light-absorbing layer (which, for convenience, will be hereinafter referred to as the reflector-absorber) on the other side such that a light beam incident on the cell from the side of the transparent electrode is reflected while a focused laser beam incident from the opposite side is absorbed and locally heats the liquid crystal.

Let us consider, for example, a reflective liquid crystal cell of the type described above used for projecting images on a screen. One way to write images in the cell, or to cause images to be projected by a projection apparatus of which this liquid crystal cell is a part, is to initially align the liquid crystal molecules in the cell such that their planes are parallel to the layer surface. When the liquid crystal molecules are thus aligned, beams of light incident thereon are specularly reflected from the light-reflective layer and provide, when imaged by a bright field projection system, a bright background on the projection screen. If laser energy is directed from behind to selected areas on the reflector-absorber, the liquid crystal molecules in the addressed areas are heated to become randomly oriented, but are then quickly cooled into a light scattering texture such as focal conic. This causes the projected light to scatter and these areas appear dark on the projection screen. This mode of writing will be referred to as positive writing.

When the background is very bright and written images are very thin, however, such images may not be easily visible on a bright background. For this and other reasons such as superposition of colored images, it is frequently desirable to write by creating light images against a dark background. This mode of writing, being the opposite of the aforementioned positive mode of writing, will be referred to as negative writing. The initial step in this mode of writing is to give the liquid crystal material a light scattering texture over the entire cell area. Thereafter, laser energy is applied as in the case of positive writing to selected areas of the absorber to heat the liquid crystal material in these areas into an isotropic state. An electric field is simultaneously applied across the liquid crystal layer such that the liquid crystal material which has been heated into the isotropic state, while cooling, becomes more uniformly aligned, i.e., less light scattering, but not those molecules outside the laser selected areas which continue to provide a dark background. As a result, the laser-addressed areas appear bright against the initially created dark background.

One method of initially creating a dark background has been to scan all the absorber surface with its laser beam in what may be referred to as a raster mode of writing. This is a very slow process. Another method has been to pas current through one of the conductive layers which is adjacent to the liquid crystal layer and serves as an electrode. When the electrode heats up from the current, the liquid crystal is heated into isotropic phase. Withdrawal of the current causes the liquid crystal to cool back to the smectic phase and, in the absence of a voltage difference across the layer, a scattering layer is formed which appears dark in a bright projection system. This method, however, produces variations in texture sometimes, especially after the cell has been used many times. Still another method has been to incorporate conductive dopants in the liquid crystal material and to pass current across the material.

In prior art, it was necessary to pattern this conducting electrode into resistive strips or to fabricate the electrode with a spatially varying resistance distribution in order to achieve uniform darkening.

SUMMARY OF THE INVENTION

It is therefore an object of the present invention to provide a method of quickly creating a dark background in a liquid crystal cell.

It is another object of the present invention to provide a liquid crystal cell in which a dark background can be formed quickly by using a uniform conductive electrode.

It is still another object of the present invention to provide a method of creating a dark background of uniform texture in a liquid crystal cell.

It is still another object of the present invention to provide a method of creating efficiently a dark background of different colors and shades by using a projection apparatus with a single liquid crystal cell.

It is still another object of the present invention to provide a liquid crystal cell in which a dark background of different colors and shades with or without a cursor or overlay images can be quickly formed.

It is still another object of the present invention to provide a liquid crystal cell on which fine (narrow) bright lines on a dark background can be drawn. The above and other objects of the present invention are achieved by providing a liquid crystal cell which may have its surface divided into regions with busbars positioned along the edges and the boundary lines between adjacent regions such that the liquid crystal in each region can be independently and uniformly heated. A conductive layer adjacent to the liquid crystal layer is divided into separate sections, individually matching the regions such that an electric field can also be applied across the liquid crystal layer over a selected region. An uniform dark background can be obtained by passing a single current pulse lasting long enough to heat the desired thickness of liquid crystal and short enough to permit rapid cooling of the liquid crystal. Rapid cooling is required to get a high density of scattering centers and resultant high scattering efficiency. A better result is obtained if two or more current pulses are passed such that the material heated by the first pulse are partially cooled before the second pulse is passed. An even more complete erasure is achieved if a blank dark screen is produced first by a pulse of voltage applied across the liquid crystal layer and then the aforementioned method of producing a dark background with two pulses is used. A blank bright screen is produced by inverting the above sequence.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a schematic view showing an image projection apparatus incorporating a liquid crystal cell of the present invention, FIG. 2 is a cross-sectional view of a portion of a liquid crystal cell showing its cross-sectional structure, FIG. 3 is a plan view of the liquid crystal layer of the cell shown in FIG. 2, taken along the line 3—3 of FIG. 2, FIG. 4 is a plan view of the transparent conductor of the liquid crystal cell of FIG. 2, taken along the line 4—4 of FIG. 2, and FIG. 5 is a plan view of the liquid crystal layer of a single-region cell embodying the present invention.

DETAILED DESCRIPTION OF THE INVENTION

In one aspect, the present invention relates to a liquid crystal cell, either reflective or transmissive, for projecting precisely defined images either for displaying on a screen or for creating a copy. A projection system for full-color images in which such a liquid crystal cell may be incorporated is disclosed in U.S. patent application Ser. No. 861,492, filed May 9, 1986 and assigned to the present assignee, and illustrated schematically in FIG. 1.

With reference to FIG. 1, a projection system 10 uses an arc lamp 11 as a source of light and an optical system 12 serves to split its output into four beams a, b, c and d, each directed onto one particular region of a reflective liquid crystal cell 14. Three of these beams are color beams (red, green and blue) and the fourth is a white beam. A lens array 15 is disposed such that reflected beams of different colors from the liquid crystal cell 14 are projected in registration onto a single surface on a projection screen 16 so as to result in a precisely focused full-color image with or without a cursor or overlay images on the same surface. Illumination systems of the type schematically illustrated above have been known and hence will not be described in further detail.

FIG. 2 is a schematic view showing the basic cross-sectional structure of the liquid crystal cell 14 with a liquid crystal layer 20 sandwiched between a transparent conductive layer 22 advantageously of indium-tin oxide (ITO) and an absorber-reflector 24. The absorber-reflector 24 may illustratively comprise a chromium absorber layer 25 and an aluminum layer 26 and an alignment layer 27 and an anti-reflectant coating 28 which may comprise three layers, $SiO_2$, $TiO$, $SiO_2$, designed to maximize the absorption of writing laser light by the chromium absorber layer 25. The aluminum layer 26 is adjacent to the liquid crystal layer 20 and serves as a reflective mirror to light beams made incident from the front, or from the direction of the transparent conductive layer 22. The chromium layer 25 serves to absorb laser energy made incident on selected surface areas thereof. Outside the transparent conductive layer 22 and the absorber-reflector 24 are transparent substrates 30 and 31, for example, of borosilicate glass. Advantageously an anti-reflective coating layer 32 may be added to the opposite surface of plate 31.

According to one method of practicing the present invention, a dark background is formed in a liquid crystal cell by applying a short voltage pulse across one of the conductive layers adjacent to the liquid crystal layer 20. For example, the voltage pulse may be an A.C. square wave at 10 kHz which has a pulse period of less than ten milliseconds. This voltage causes current to flow in the layer which heats the adjacent liquid crystal material to a depth which depends upon the duration of the pulse. The heat causes random orientation of the crystal molecules to form scattering centers.

Preferably, the pulses have a very short duration, on the order of one millisecond, whereby the scattering centers are smaller and more localized near the surface of the pulse carrying conductive layer. Finer lines can be written in such localized layers and short laser-on times are required to write through these layers. The thinner scattering layers will have less contrast. Thus, the pulse duration and pulse height (energy) are selected to give the desired contrast and line thickness.

The liquid crystal cell is cleared i.e., all the crystal molecules are aligned, by applying a voltage between the conductive layers 22 and 25.

Although darkening the background with a single pulse is the most straightforward method and its results are acceptable for several cycles after the cell is refreshed, variations in texture begin to appear with frequency of use. According to another method of the present invention, two or more voltage pulses are applied to create a dark background. The interval between the pulses should advantageously be such that the liquid crystal is allowed to cool only partially in one interval but typically long enough such that scattering centers form between the pulses. The pulse duration and the number of pulses are selected to provide scattering centers to the desired depth adjacent the conductive layer. According to a preferred method of writing bright lines on a uniform dark background, the dark background is created with two current pulses each with 0.65 milliseconds in width and having a spacing of 500 milliseconds therebetween. This creates uniform lines with good contrast ratio such as lines of 15-micron width with a 10:1 contrast ratio.

The liquid crystal cell can be operated with single or multiple scattering pulses preceded by one or more clearing or refresh pulses. The duration of the combination of scattering pulses may have different pulse widths.

Thus, according to still another method embodying the present invention, a blank bright screen is produced first before a dark background is prepared. A blank bright screen is produced by passing a current pulse in one of the conductive layers adjacent to the liquid crystal layer to heat the liquid crystal molecules and simultaneously or subsequently applying an electric field across the liquid crystal layer as the liquid crystal molecules cool down. Thereafter, the aforementioned method of darkening the background with a double pulse is used. It has been experimentally shown that bringing the entire projected area to the same darkness level as the higher-contrast dark lines in the written image before erasing to reach the desired level of darkness produces a much more complete erasure, that is, a much more uniform background, particularly when the cell has been operating for a long time without refreshment.

For best performance, the cell needs to be refreshed periodically. This is normally done by heating the liquid crystal to the isotropic phase and allowing it to cool to the smectic phase in the presence of an electric field. This takes several minutes. The projections on the screen of the phase changes may be cosmetically undesirable to some observers. Heating it to a point between normal operating temperature and the first phase change, then applying short pulses of current, produces similar performance improvement in less time with no cosmetic drawbacks.

In the above, various methods of creating a uniform dark background have been described by way of FIG. 2 showing the cross-sectional structure of the liquid crystal cell. Although these methods include steps of passing current pulses in one of the conductive layers adjacent to the liquid crystal layer, no details have been given regarding how such current pulses are passed. In what follows, there will be presented a method of passing such current pulses which is particularly suited for producing a uniform background in a full-color display mode of operation with or without a cursor or overlay images.

As illustrated schematically in FIG. 1, the liquid crystal cell 14 according to an embodiment of this invention is divided into four regions. In FIG. 3 which is a sectional plan view of the liquid crystal layer 20 immediately adjacent to the absorber-reflector 24 taken along the line 3—3 of FIG. 2, the absorber-reflector layer 24 is shown to be divided into four equally shaped quadrangular regions 24-1, 24-2, 24-3 and 24-4, each of them being adjacent to two of the other. Six mutually parallel busbars 35-1, ..., 35-6 are bonded to the reflective layer 26 to serve as electrodes as shown. The busbars 35-1 and 35-4 are on the same edge of the liquid crystal cell 20 and respectively in contact with the regions 24-1 and 24-3. The busbars 35-3 and 35-6 are on the opposite edge of the liquid crystal cell 14 and respectively in contact with the regions 24-2 and 24-4. The busbar 35-2 is on the boundary line between the regions 24-1 and 24-2. The busbar 35-5 is on the boundary line between the regions 24-3 and 24-4. Each busbar is illustratively made by vacuum depositions first of chromium, then aluminum, then nickel and then gold, and is connected to a voltage source (not shown) such that a desired potential difference can be applied between any pair of the busbars. Although the liquid crystal material 20 is continuous, the cell 14 is effectively divided into four distinct regions 20-1 through 20-4. In order to heat the liquid crystal molecules in the region 20-1, either to subsequently cool them with or without an electric field applied across the liquid crystal layer 20, a voltage difference is applied between the mutually adjacent busbars 35-1 and 35-2. the liquid crystal molecules in other regions can be heated similarly by applying a voltage difference between an appropriate pair or pairs of mutually adjacent busbars. To achieve uniform darkening, it is generally required that the resistance of the busbars be considerably lower than that of the reflective layer 26 through which current pulses are passed; this is particularly true for the central busbars 35-2 and 35-5 which are accessible for electrical connection only at one end of each in the assembled cell.

FIG. 4 is a plan sectional view of the transparent conductive layer 22 taken along the line 4—4 of FIG. 2. Corresponding to the regions 20-1, ..., 20-4 into which the liquid crystal cell 14 is divided, the transparent conductive layer 22 according to this embodiment of the invention is divided into four mutually separated sections 22-1, 22-2, 22-3, and 22-4 which match the aforementioned regions individually in face-to-face relationships such that a voltage difference can be applied between the absorber-reflector 24 and any selected one or more of the sections 22-1, ..., 22-4, that is, an electric field across the liquid crystal layer 20 can be applied over any selected one or more of the regions 20-1, 20-4. To do negative writing in the region 20-1, for example, a voltage difference is applied between the absorber-reflector 24 and the section 22-1 which matches the region 20-1, while laser energy is addressed to the liquid crystal 20 through the absorber 25 as explained above. Likewise, a selected region such as the region 20-1 can be cleared by applying a greater voltage difference between the absorber-reflector 24 and the section 22-1.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the number of regions into which the liquid crystal cell is divided does not limit the scope of the present invention. In particular, single-region cells as shown in FIG. 5 are intended to be within the scope of this invention. Although a reflective liquid crystal cell was described, the present invention is equally applicable to a transmissive liquid crystal cell if the absorber-reflector 24 of FIG. 2 is replaced by another transparent conductor layer. Optical systems of many different types can be used in combination with such liquid crystal cells although only an example of application to an image projection apparatus was described above. Such modifications and variations which may be apparent to a person skilled in the art are intended to be included within the scope of this invention.

What is claimed is:

1. In a liquid crystal cell for a light control device, said liquid crystal cell being generally planar, having a surface area bounded by peripheral edges, and comprising a liquid crystal layer sandwiched between a first conductive layer and a second conductive layer and first means for applying a voltage difference between said conductive layers, the improvement wherein said surface area defines a plurality of mutually adjacent regions, each mutually adjacent pair of said regions defining therebetween a boundary line, said liquid crystal cell further comprising a plurality of busbars disposed along said peripheral edges and said boundary lines, and second means for applying a voltage difference between at least one mutually adjacent pair of said busbars.

2. The liquid crystal cell of claim 1 wherein said first conductive layer includes a light absorbing layer distal said liquid crystal layer and a light-reflecting layer proximal said liquid crystal layer.

3. The liquid crystal cell of claim 1 wherein said second conductive layer is divided into separate sections individually matching said regions.

4. The liquid crystal cell of claim 1 wherein said first means is connected to apply a voltage difference between said first conductive layer and selected one or more of said sections.

5. The liquid crystal cell of claim 1 wherein said busbars have resistance considerably lower than that of said first conductive layer.

6. A method of operating an optical device which includes a liquid crystal cell, said liquid crystal cell being generally planar, having a surface area bounded by peripheral edges and comprising a liquid crystal layer sandwiched between a first conductive layer and a second conductive layer, said method comprising the steps of defining on said surface area a plurality of mutually adjacent regions, each mutually adjacent pair of said regions defining therebetween a boundary line, attaching onto said first conductive layer a plurality of busbars along said peripheral edges and said boundary lines, selecting at least one mutually adjacent pair of said busbars and causing a voltage difference to be applied between each of said selected pairs of busbars, whereby said optical device produces a dark background.

7. The method of claim 6 further comprising the step of dividing said second conductive layer into separate sections individually matching said regions.

8. The method of claim 7 wherein said step of causing a voltage difference to be applied comprises the steps of selecting one of said regions, and writing in said selected region by applying a first electric field between said first conductive layer and one of said sections which matches said selected region while a laser beam is addressed to said selected region.

9. The method of claim 8 wherein said method further comprises the step of clearing said selected region by applying a second electric field between said matching section and said first conductive layer, said second electric field being much stronger than said first electric field.

10. A method of operating an optical apparatus which includes a liquid crystal cell, said liquid crystal cell comprising a liquid crystal layer sandwiched between a first conductive layer and a second conductive layer, and means for causing a voltage difference between said conductive layers, said method comprising the step of darkening said liquid crystal cell by passing a current pulse of duration on the order of one millisecond in one of said conductive layers.

11. A method of operating an optical apparatus which includes a liquid crystal cell, said liquid crystal cell comprising a liquid crystal layer sandwiched between a first conductive layer and a second conductive layer, and means for causing a voltage difference applied between said conductive layers, said method comprising the step of uniformly darkening said liquid crystal cell by passing in one of said conductive layers a double current pulse with first and second pulses separated such that molecules of said liquid crystal layer heated by said first pulse are cooled only partially before said second pulse is applied but that scattering centers form between said pulses.

12. The method of claim 11 further comprising the step of creating a bright background for said liquid crystal cell prior to said step of uniformly darkening said liquid crystal cell, said step of creating a bright background comprising the step of applying a voltage difference between said first and second conductive layers.

13. The method of claim 11 wherein said first and second pulses are of duration on the order of one millisecond.

14. The method of claim 11 wherein said first and second pulses are approximately of duration of 0.65 milliseconds and spaced by about 500 milliseconds.

15. The method of claim 11 wherein said double current pulse is followed by one or more additional current pulses.

16. A method of refreshing a liquid crystal cell which comprises a liquid crystal layer, said method comprising the steps of heating said liquid crystal layer to an isotropic phase and allowing said layer to cool to a smectic phase in the presence of an electric field.

17. The method of claim 16 wherein said heating step comprises heating to a point between normal operating temperature and the first phase change.

18. The method of claim 16 further comprising the step of passing one or more current pulses in a conductive layer adjacent to said liquid crystal layer.

19. The liquid crystal cell of claim 1 wherein each of said regions has a pair of said busbars disposed along opposite sides thereof.

20. The method of claim 6 wherein each of said plurality of regions has a pair of said busbars disposed along opposite sides thereof.

21. In a liquid crystal cell for a light control device, said liquid crystal cell being generally planar, having a surface area bounded by peripheral edges, and comprising a liquid crystal layer sandwiched between a first conductive layer and a second conductive layer and first means for applying a voltage difference between said conductive layers, the improvement wherein said surface area defines a single region bounded by said peripheral edges, said liquid crystal cell further comprising a pair of busbars along said peripheral edges along opposite sides of said single region, and second means for applying a voltage difference between said busbars.

22. A method of operating an optical device which includes a liquid crystal cell, said liquid crystal cell being generally planar, having a surface area bounded by peripheral edges and comprising a liquid crystal layer sandwiched between a first conductive layer and a second conductive layer, said method comprising the steps of defining on said surface area a single region bounded by said peripheral edges, attaching onto said first conductive layer a pair of busbars along said peripheral edges on opposite sides of said single region, and causing a voltage difference to be applied between said busbars, whereby said optical device produces a dark background.

* * * * *